United States Patent
Sparer

(10) Patent No.: US 6,988,222 B2
(45) Date of Patent: Jan. 17, 2006

(54) POWER FAILURE DETECTION AND RESPONSE

(75) Inventor: Ronald Sparer, Loveland, OH (US)

(73) Assignee: Uniloy Milacron U.S.A. Inc., Manchester, MI (US)

( * ) Notice: Subject to any disclaimer, the term of this patent is extended or adjusted under 35 U.S.C. 154(b) by 486 days.

(21) Appl. No.: 10/308,944

(22) Filed: Dec. 3, 2002

(65) Prior Publication Data

US 2004/0107384 A1    Jun. 3, 2004

(51) Int. Cl.
G06F 11/30    (2006.01)
(52) U.S. Cl. .................. 714/22; 714/24; 713/340
(58) Field of Classification Search .......... 714/22, 714/24; 713/340
See application file for complete search history.

(56) References Cited

U.S. PATENT DOCUMENTS

| | | |
|---|---|---|
| 3,859,638 A * | 1/1975 | Hume, Jr. .................. 365/229 |
| 3,937,937 A | 2/1976 | McVey |
| 4,096,560 A | 6/1978 | Footh |
| 4,234,920 A | 11/1980 | Van Ness et al. |
| 4,375,663 A | 3/1983 | Arcara et al. |
| 4,516,214 A | 5/1985 | Ray |
| 4,534,018 A | 8/1985 | Eckert et al. |
| 4,560,887 A | 12/1985 | Schneider |
| 4,636,905 A | 1/1987 | Morimoto et al. |
| 4,689,698 A | 8/1987 | Ishikawa et al. |
| 4,706,215 A * | 11/1987 | Kirschner et al. .......... 705/405 |
| 4,922,456 A * | 5/1990 | Naddor et al. ......... 365/185.24 |
| 4,964,011 A * | 10/1990 | Sternglass .................... 361/88 |
| 5,193,176 A | 3/1993 | Brandin |
| 2001/0042168 A1 | 11/2001 | Kubo |
| 2002/0083368 A1 * | 6/2002 | Abe et al. ..................... 714/24 |

FOREIGN PATENT DOCUMENTS

| | | |
|---|---|---|
| EP | 0463821 A | 1/1992 |
| EP | 1209676 A1 | 5/2002 |

OTHER PUBLICATIONS

PCT/US03/36948.*
Tomi Engdahl, "PC power supply connectors Motherboard power connector", ELH Communications Ltd., undated.
Charles M. Kozierok, "Power Good Signal", The PC Guide, http://www.PCGuide.com, Site Version: 2.2.0—Version Date: April 17, 2001.

* cited by examiner

Primary Examiner—Scott Baderman
(74) Attorney, Agent, or Firm—John W. Gregg

(57) ABSTRACT

A computer system comprising a personal computer assembly (motherboard), memory for storing data, means for detecting loss of applied power, and means responsive to the detecting means for inhibiting data transfers by the processor of the personal computer and the memory. In accordance with the invention, memory comprises non-volatile memory and the inhibiting means applies a signal to the memory to inhibit data transfer operations of the memory. The means for detecting loss of applied power detects loss at a power mains connection of a power supply for supplying operating power to the personal computer assembly. A machine control comprises a computer system according to the invention.

14 Claims, 2 Drawing Sheets

POWER FAILURE DETECTION AND RESPONSE

I. BACKGROUND OF THE INVENTION

1. Field of the Invention

This invention relates to power failure detection for computers and systems comprising computers. In particular, this invention relates to early detection of power loss for systems comprising personal computers.

2. Description of Related Art

It is known in the art of digital computer systems to provide for detection of power failure and to effect a response thereto. For large computer systems it is known to provide auxiliary sources of power generation to permit continued supply of power indefinitely in the event of loss of supply from the primary source. Conversely, for so-called "personal computers", it is known to provide so-called un-interruptible power supplies that incorporate auxiliary power sources to permit temporary operation in the event of loss of power from the primary source. While the use of such power supplies insures adequate power to effect an orderly shut down of the computer, such power supplies add substantial cost. It is known in the art to monitor the outputs of a personal computer power supply to detect out of tolerance conditions typical of loss of power from the primary source. As loss of applied power to power supplies for personal computers will result in gradual decay of power supply outputs, it is known to inhibit certain operations of such computer components on detection of out-of-tolerance conditions of power supply outputs.

Of particular concern with respect to loss of power is the potential for corruption of data stored in non-volatile, re-writable memory. For purposes of this description, non-volatile, re-writable memory is a data retention facility in which data may be recorded and replaced in normal use, and wherein the recorded data will be retained indefinitely in the absence of supply of power from a source external to the facility. Known devices providing these capabilities include magnetic disk memories, optical disk memories, and non-volatile semiconductor memories. As power supply outputs decay, out-of-tolerance operating voltages can result in uncontrolled operation of such memory devices and corruption of data recorded therein. Of particular concern in this regard is the potential for corruption of operating system program data and the attendant inability to successfully restart the computer thereafter. Hence, there is a need to reduce or eliminate potential data corruption in the event of power failure without use of auxiliary power sources.

II. SUMMARY OF THE INVENTION

It is an object of the present invention to provide a computer system comprising means for preventing corruption of data stored in non-volatile, re-writable memory of the computer system in the event of power failure.

It is a further object of the present invention to provide a computer system comprising a personal computer, means for detecting loss of applied power and means responsive to the detecting means for inhibiting operations of the personal computer that could result in corruption of stored data.

It is a still further object of the present invention to provide a machine control comprising a personal computer system, means for detecting loss of applied power and means responsive to the detecting means for inhibiting data transfers to and from non-volatile, re-writable memory comprising the personal computer.

Further objects and advantages of the invention shall be made apparent from the accompanying drawings and the following description thereof.

In accordance with the aforesaid objects the present invention provides a computer system comprising non-volatile, re-writable memory for storing data, means for detecting loss of applied power, and means responsive to the detecting means for inhibiting data transfers by processor elements of the computer and the memory. The inhibiting means applies a signal to the computer system to inhibit data transfer operations. The means for detecting loss of applied power detects loss at power mains applying power to a supply for supplying operating power to the computer system. The invention contemplates a machine control comprising a computer system and means for detecting loss of applied power and means responsive to the detecting means for inhibiting data transfers whereby corruption of data recorded in non-volatile, re-writable memory comprising the computer system is prevented.

III. BRIEF DESCRIPTION OF THE DRAWINGS

IV. DETAILED DESCRIPTION OF THE PREFERRED EMBODIMENT

Computer System

Figure 1:
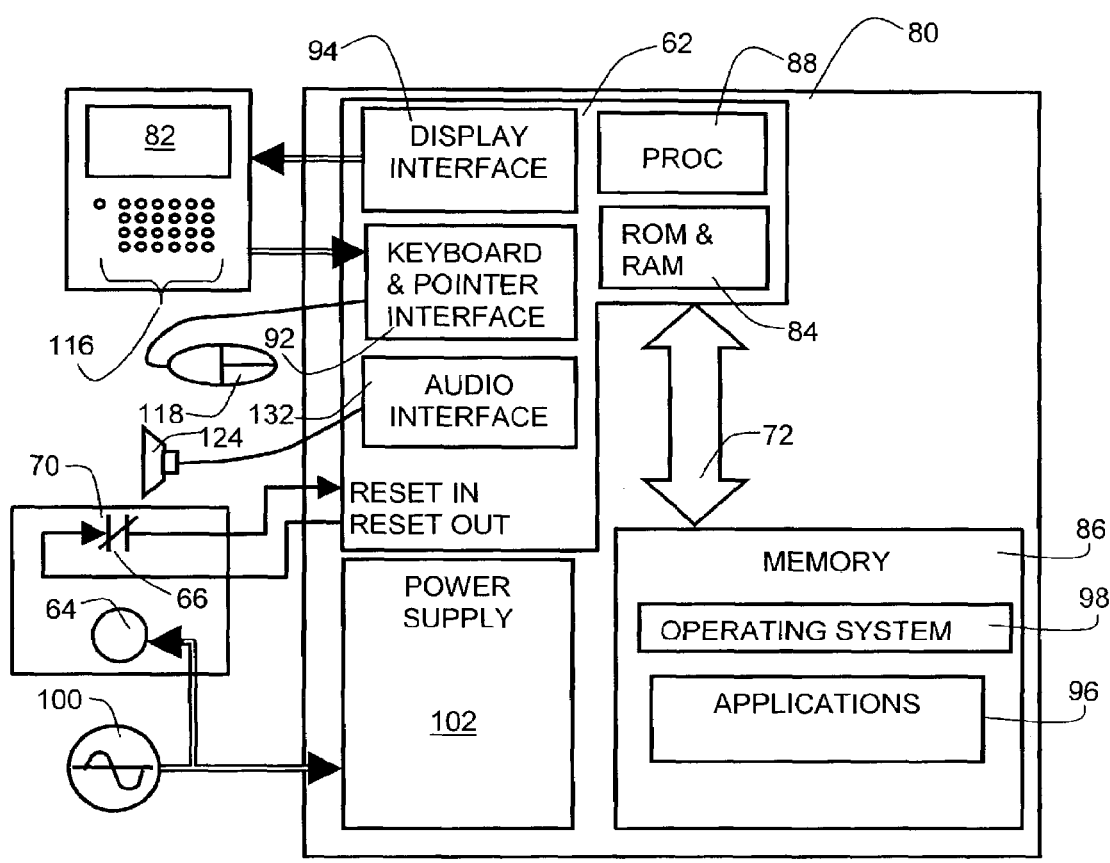
FIG. 1 is a block diagram of a personal computer system in accordance with the invention.

To illustrate the invention a preferred embodiment comprising a personal computer shall be described in detail. It is not the intention of the applicants to limit the scope of the invention to the preferred embodiment, but rather that the invention be defined by the appended claims and all equivalents thereto. Personal computer systems of the preferred embodiment are advantageously "open architecture" systems. A principle characterizing feature of "open architecture" systems is that information regarding hardware and software interfaces for the computer system are publicly available facilitating supply of compatible software (computer programs) and hardware (devices) by sources independent of the producer of the computer system. Compatible software includes operating system programs such as, but not limited to, the WINDOWS family of programs available from Microsoft Corp. and a wide variety of application programs providing information processing functions such as data collection and analysis, and word processing. Compatible hardware range from individual circuit elements to complete functional elements such as so called "sound cards" which may be advantageously added as internal components of the personal computer system.

A preferred embodiment of a personal computer system shall be described with reference to FIG. 1. Personal computer system 80 comprises a non-volatile, re-writable mass data storage device such as memory 86, and a personal computer assembly (motherboard) 62 comprising at least one processor 88, random access memory ("RAM") and/or read only memory ("ROM") 84, and interfaces 94 and 92 for, respectively, a display device 82, keyboard 116, and a pointing device 118 such as a "mouse". Additional interface circuitry includes interface circuits 132, for example, a conventional "sound card" for a personal computer and interfaces not shown for connection to peripheral devices such as printers, and other input and output devices which incorporate interface and control components to support signal exchanges with personal computer assembly 62. Display device 82, keyboard 116, and pointing device 118 may all comprise components of an assembly, such as a notebook computer, or may be separate components connected by cables to computer system 80.

Elements of motherboard 62 are interconnected by one or more "busses" (not shown in FIG. 1), typically conforming to industry standards and providing conductors for transfer of signals representing data and addresses, as is conventional. Memory 86 is a non-volatile, re-writable memory, i.e., a data retention facility in which data may be recorded and replaced in normal use, and wherein the recorded data will be retained indefinitely in the absence of supply of power from a source external to the facility. Memory 86 may comprise circuit boards having non-volatile, re-writable memory devices and mounted to motherboard 62 and connected thereto via electrical connectors and/or cable assemblies illustrated in FIG. 1 by cable 72. Advantageously, memory 86 may comprise a disk memory, advantageously a magnetic disk memory, connected to personal computer assembly 62 by cable 72 providing connections for plural address and data signals. While processor 88 is illustrated as a single element, as used in this description and the appended claims, "processor 88" or "processor" shall be deemed to represent one or more microprocessors, so-called "co-processors", and the like, for executing programs stored in memory 84 and disk memory 86. Further, memory 86 includes local processing facilities for control of reading and writing operations. In the circumstance that memory 86 is a disk memory, local processing facilities control mechanisms for positioning the read/write elements relative the storage media.

As is conventional, data processing functions performed by personal computer 80 are controlled by operating system programs, some of which may be recorded in ROM 84 and others, including open architecture operating system programs 98, may be stored in memory 86. Operating system programs 98 control the execution of "application" programs such as application programs 96 by processor 88. Examples of application programs include commercially available word processing programs, database management programs, so-called "spreadsheet" creation and editing programs, so-called "presentation" creating and editing programs, as well as proprietary programs created for particular functions such as management and control of machinery and equipment.

The present invention is directed to detection of loss of applied power and inhibition of data transfer operations by personal computer system 80 that could result in corruption of stored data in memory 86. Referring to FIG. 1, applied power from a source 100, illustrated as an alternating current source, is applied to power supply 102 that converts applied power to various operating values for supplying electrical power to components of personal computer system 80. Outputs of power supply 102 will advantageously include low level direct current voltages for power for logic devices such as processor 88, low level direct current voltages for interface circuits, and electrical ground (reference and return path for output voltages). It is typical of power supplies used to provide operating voltages for personal computer components that in the event of loss of applied power from source 100, outputs of power supply 102 will decay over time rather than change abruptly to electrical zero. Consequently, power used by motherboard 62 and by memory 86 is susceptible of decay in such a way that data transfers initiated by processor 88 or memory 86 may not be satisfactorily completed. Of particular concern with respect to memory 86 is potential loss of control thereof and consequent undesired overwriting of data recorded therein. To inhibit initiation of data transfers that might otherwise not be satisfactorily completed and prevent un-controlled operation, it is contemplated by the present invention to apply a control signal to the "RESET" input of personal computer assembly 62. An active level for the RESET input is provided by the RESET output of computer assembly 62. Further, the RESET input of motherboard 62 is connected to a RESET input of memory 86 via cable 72. When the RESET input is active, processor 88 and memory 86 are inhibited from initiating data transfers while data transfers in progress at the onset of the active level of the RESET input may be satisfactorily completed.

Continuing with reference to FIG. 1 a switching device 70 is connected to transfer the active level produced by the RESET output of motherboard 62 to the RESET input. As illustrated, switching device 70 comprises an electromagnetic relay having coil 64 and normally closed switching contacts 66. Coil 64 is connected to power source 100, and is energized so long as power is applied from source 100. Normally closed contacts 66 of the relay are connected between the RESET output of motherboard 62 and the RESET input of motherboard 62, the RESET output providing a signal for activating the RESET input. It is contemplated that the active level for the RESET input may be supplied from sources other than the RESET output, it be required only that the active level be applied to only in the event of loss of power applied to switching device 70 from source 100. Further, it is contemplated that switching devices other than an electromagnetic relay may be used to apply the active level to the RESET input in the event of loss of applied power from source 100.

So long as power is supplied by source 100, normally closed contacts 66 are open, hence the activating signal from the RESET output is not connected to the RESET input while coil 64 is energized. In the event of loss of applied power, coil 64 is de-energized, contacts 66 close, and the RESET input is connected to the active signal level provided by the RESET output. As the decay of outputs of power supply 102 will take much longer than de-energization of coil 64 and closure of contacts 66, the RESET input will be activated before the decay of power supply outputs can result in incomplete data transfers or uncontrolled operation of memory 86. Hence, corruption of data stored in non-volatile, re-writable memory is prevented.

Machine and Control

To illustrate the invention as applied to a machine control comprising a computer, a preferred embodiment comprising an injection molding machine and control shall be described in detail. While the machine of the preferred embodiment is an injection molding machine, it is not the intention of the applicants to limit the scope of the invention to injection molding machines or controls therefore, it being expressly contemplated that the invention is equally well suited to controls of other machines, and particularly to controls for other plastics processing machines and associated equipment, including without limitation, blow molding machines, extruders, extrusion blow molding machines and the like.

Plastics Processing Machine & Equipment

Figure 2:
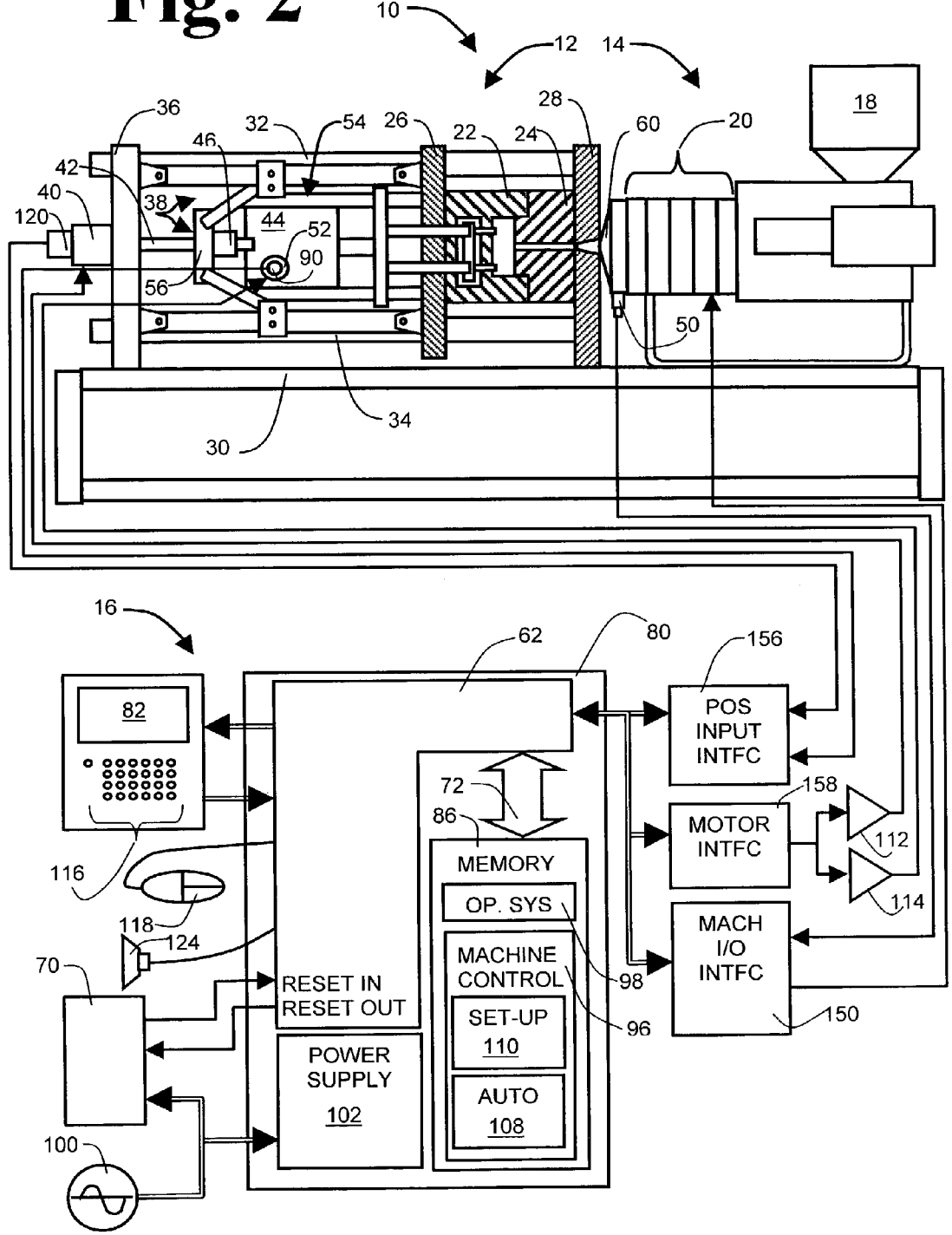
FIG. 2 is a block diagram of an injection molding machine and control comprising a personal computer in accordance with the invention.

Referring to FIG. 2, an injection molding machine 10 includes a clamp assembly 12 and an injection unit 14.

Typical of plastic injection molding machines, raw material in the form of pellets and/or powders is introduced to injection unit 14 through hopper 18. Injection unit 14 includes a barrel portion 60, typically surrounded by external heating elements 20, and an internal material working screw, not shown. As raw material is melted, i.e. plasticized, by a combination of heating and material working, the plasticized material is conveyed toward the exit end of injection unit 14, displacing the interior screw away from clamp assembly 12. Once a sufficient volume of material has been plasticized, the working screw is advanced within barrel portion 60 to force material through the exit into a cavity defined by mating mold sections 22 and 24. Clamp assembly 12 holds mold sections 22 and 24 together during injection and thereafter until the injected material has sufficiently solidified to be removed without unacceptable deformation. Movable platen 26 is then retracted, separating mold section 22 from mold section 24 to permit release of the molded article.

Continuing with reference to FIG. 2, clamp assembly 12 comprises fixed platen 28, movable platen 26, thrust or "die height" platen 36 and toggle link mechanism 38. Fixed platen 28 supports mold section 24 and is rigidly mounted to machine base 30. Strain rod pairs 32 and 34 are supported at opposite ends by fixed platen 28 and thrust or die height platen 36. Movable platen 26 is slidably supported on strain rod pairs 32 and 34 for reciprocation between "open" and "closed" positions, "closed" referring to the advanced position as shown in FIG. 2. A toggle link mechanism 38, interposed between movable platen 26 and thrust platen 36, is operated by a low friction screw and nut combination comprising screw 42 and nut 46. Screw 42 is rotated by motor 40 through a transmission providing mechanical advantage, by, for example, reducing gears or belt driven pulleys, or combinations of the foregoing, as is well known. A toggle link crosshead 56 is mounted to move with nut 46. Alternatively, reciprocation of toggle link crosshead 56 may be effected by a motor driven rack and pinion combination as is well known. Toggle link mechanism 38 is preferably operable to a "lock-over" configuration, as shown in FIG. 2 wherein serial pivoting links between thrust platen 36 and movable platen 26 are longitudinally aligned. On opening, reciprocation of crosshead 56 pivots these links to reduce the effective length spanned by the links and draw movable platen 26 away from fixed platen 28.

The combination of screw 42 and toggle link mechanism 38 provides sufficient mechanical advantage to convert torque at motor 40 to the desired clamping force. As is conventional, motor 40 is preferably a servo-motor and includes or works in combination with a position measuring transducer 120 which produces electrical signals representing position of the motor armature. In the configuration illustrated in FIG. 2, position transducer 120 may be an encoder for measuring angular position of an armature of motor 40. Were motor 40 a linear motor, position transducer 120 could as well measure linear position of the motor armature. Alternatively, position transducer 120 may measure linear displacement and be mechanically coupled to crosshead 56.

Continuing with reference to FIG. 2, a power operated ejector mechanism 54 is illustrated in FIG. 2 disposed between thrust platen 36 and movable platen 26. Ejector mechanism 54 effects translation of movable members in mold section 22 to dislodge an article from mold section 22. Motor 52 provides motive force for ejector mechanism 54 through transmission 44. Motor 52 is mounted to and supported by transmission 44 which is fixably supported by movable platen 26 so that transmission 44 and motor 52 move with movable platen 26.

As shown in FIG. 2, motor 52 is a rotating machine, wherein an armature and stator are arranged for rotation of one relative to the other. As is conventional, motor 52 is preferably a servo-motor and includes or works in combination with a position measuring transducer 90 which measures relative angular position. Also, as is well known for control of servo motors, other transducers may be used with motor 52 to measure, for example, angular velocity or to detect motor element relative locations for motor current commutation. Transmission 44 converts rotation of the armature of motor 52 to translation for reciprocation of ejector pins in mold section 22. The motion conversion of transmission 44 and the operation of transducer 90 are such that position of an armature of ejector mechanism 54 within its range of translatory motion can be unambiguously determined from measurement of angular position by position transducer 90. In the configuration illustrated in FIG. 2, position transducer 90 may be an angular position encoder.

It is well known in the art of injection molding to use associated peripheral equipment such as, for example, material dryers, parts handlers, material conveyors, and inspection subsystems. In addition, it is well known in the art of injection molding to use active tooling components such as mold heaters and hot-runner sub-systems. While no peripheral equipment or active tooling components are illustrated in FIG. 2, the present invention contemplates storage of data representing information associated with use of such equipment and components.

Control

The preferred embodiment of a machine control system comprises an "open architecture" personal computer of the type described with reference to FIG. 1. By virtue of the standardized manner software and hardware can be installed in so called open architecture environments, mechanism control functions implemented as proprietary programs can be supplied to effect machine control at substantially less cost than can be achieved using low volume and/or proprietary environments. Components of the machine control system of FIG. 2 corresponding to components of the computer system of FIG. 1 are shown with the same reference numbers. Control system 16 comprises computer system 80 comprising a non-volatile re-writable storage device such as memory 86, and a personal computer assembly (motherboard) 62, a display device 82, keyboard 116, and a pointing device 118 such as a "mouse". Memory 86 is a non-volatile, re-writable memory, as described with reference to FIG. 1. Advantageously, memory 86 may comprise a disk memory, advantageously a magnetic disk memory wherein local processing facilities control mechanisms for positioning the read/write elements relative the storage media. It will be understood that loss of control of memory 86 from decay of operating power supplies could result in over-writing of data recorded therein, consequently preventing restarting of control 16 on restoration of power and preventing use of machine 10 until restoration of the contents of memory 86.

As is conventional, data processing functions performed by computer system 80 are controlled by operating system programs 98 controlling execution of "application" programs such as machine control programs 96. Machine control 16 produces signals for controlling the operation of machine devices, such as motors 40 and 52 which actuate mechanisms of the injection molding machine, heaters 20 and other devices not shown but typical of such machines and associated equipment. Output signals defining, for example, position, velocity, and/or acceleration are conditioned as appropriate at motor interface circuits 158 and applied to motor drives 112 and 114 to control electrical current delivered to motors 40 and 52 from a suitable power source. As is conventional, signals produced by position transducers 120 and 90 are used for control of motors 40 and 52. Outputs of transducers 120 and 90 are conditioned for use by computer system 80 by position interface circuits 156. Machine input/output interface circuits 150 perform signal conditioning for other signals produced by or applied to machine devices such as, respectively, temperature sensor 50 measuring temperature of barrel 60 and heating elements 20. As shown in FIG. 2, electrical connections are provided between interface circuits 150, 156 and 158, and motherboard 62 to permit exchange of signals between computer system 80 and the interface circuits.

Machine control programs 96 perform logical and arithmetic functions to monitor and control the operation of machine elements and, typically, to enable or initiate the operation of peripheral equipment and/or active tooling components. Typically, such programs permit at least two modes of operation: (i) an automatic mode for normal production; and (ii) a set-up or manual mode, for preparing the machine, peripheral equipment and tooling components for production and for setting parameter values used by the machine control programs in production of particular articles from particular material. The automatic mode of operation is associated with "AUTO" programs 108 of FIG. 2, and the set-up or manual mode of operation is associated with the "SET-UP" programs 110.

During automatic operation of machine 10, machine control programs 96 effect periodic sampling and storage of values of conditions of machine devices provided by sensors associated with, for example, motors and heaters. These stored values together with set point data retrieved from memory, are used for evaluation of control algorithms. Set point data may advantageously include: injection velocity profile data; mold die height; ejector stroke distance; temperature set points for heaters; servomechanism parameters for motor controls; and, electrical current limit values for control signals applied to motors 40 and 52 as well as heating elements 20. Control algorithms associate set points with measured values and control signals in accordance with an arithmetic and/or logical model of the controlled devices. Evaluation of control algorithms produces values of control signals that are then translated by interface circuits to conform to level and power requirements of the machine devices to which they are applied. In addition to routine transfer of data to and from memory in the normal course of execution of machine control programs, other data transfers may be effected by normal operation of the memory devices themselves and/or control programs intended for efficient allocation of memory capacity.

Power for machine control 16 is supplied by a source 100, illustrated as an alternating current source. Power from source 100 is applied to power supply 102 for conversion to various operating values used by the components of machine control 16, including computer system 80. As is typical of power supplies used for personal computer systems, in the event of loss of applied power from source 100, outputs of power supply 102 will decay over time rather than change abruptly to electrical zero. Consequently, power used by motherboard 62 and by memory 86 is susceptible of decay in such a way that data transfers initiated by processor 88 or memory 86 may not be satisfactorily completed. Of particular concern with respect to memory 86 is potential loss of control thereof and consequent undesired overwriting of data recorded therein. As with the computer system of FIG. 1, the invention contemplates application of a control signal to the "RESET" input of personal computer assembly 62. As shown in FIG. 2, the control signal or active level for the RESET input is applied by switching device 70. As with the computer system of FIG. 1, the reset input of computer assembly 62 is further connected to a RESET input of memory 86 via cable 72. When the RESET input is active, processor 88 and memory 86 are inhibited from initiating data transfers while data transfers in progress at the onset of the active level of the RESET input may be satisfactorily completed.

Continuing with reference to FIG. 2 switching device 70 is shown connected between the RESET output and RESET input of motherboard 62. As with the computer system of FIG. 1, it is contemplated that alternative sources may be used to supply the active level (control signal) through switching device 70 to the RESET input. So long as power is supplied by source 100, the RESET input is maintained at an inactive level. In the event of loss of applied power, switching device 70 is de-energized and the RESET input of motherboard 62 is connected to the active signal level. As the decay of outputs of power supply 102 will take much longer than de-energization of switching device 70, the RESET input will be activated before the decay of power supply outputs can result in incomplete data transfers or uncontrolled operation of memory 86. Hence, corruption of data stored in memory is prevented.

What is claimed is:

1. A computer system comprising:
 a) an open architecture computer assembly;
 b) a non-volatile, re-writable memory connected to the computer assembly;
 c) a power supply for converting electrical power to values for supply of power to the computer assembly and the memory;
 d) means for detecting loss of electrical power applied to the power supply, the detecting means comprising a switching device directly connected to and energized by the power applied to the power supply and producing a control signal on loss of the applied power; and
 e) means responsive to the detecting means for inhibiting initiation of data transfers by the computer assembly and the memory.

2. The computer system of claim 1 wherein the computer assembly comprises a RESET input which when activated is effective to prevent initiation of data transfers by the computer assembly and the means for inhibiting data transfers applies a control signal to the reset input in response to detection of loss of power applied to the power supply.

3. The computer system of claim 2 wherein the memory comprises a RESET input which when activated is effective to prevent initiation of data transfers by the memory and the RESET input of the memory is connected to the RESET input of the computer assembly.

4. The computer system of claim 3 wherein the memory is a disk memory end the RESET input of the memory is effective to prevent initiation of writing of data to storage media of the memory.

5. The computer system of claim 2 wherein the switching device is an electromagnetic relay having a coil energized by power applied to the power supply and switching contacts connecting an active level signal to the RESET input of the computer assembly when the coil is de-energized.

6. The computer system of claim 3 wherein the switching device is an electromagnetic relay having a coil energized by power applied to the power supply and switching contacts connecting an active level signal to the RESET input of the computer assembly when the coil is de-energized.

7. The computer system of claim 4 wherein the switching device is an electromagnetic relay having a coil energized by power applied to the power supply and switching contacts connecting an active level signal to the RESET input of the computer assembly when the coil is de-energized.

8. A machine control comprising:
   a) an open architecture computer assembly;
   b) a non-volatile, re-writable memory connected to the computer assembly;
   c) a power supply for converting electrical power to values for supply of power to the computer assembly and the memory;
   d) means for detecting loss of power applied to the power supply, the detecting means comprising a switching device directly connected to and energized by the power applied to the power supply and producing a control signal on loss of the applied power; and
   e) means responsive to the detecting means for inhibiting initiation of data transfers by the computer assembly and the disk memory.

9. The machine control of claim 8 wherein the computer assembly comprises a RESET input which when activated is effective to prevent initiation of data transfers by the computer assembly and the means for inhibiting initiation of data transfers applies a control signal to the RESET input in response to detection of loss of power applied to the power supply.

10. The machine control of claim 9 wherein the memory comprises a RESET input which when activated is effective to prevent initiation of data transfers by the memory and the RESET input of the memory is connected to the RESET input of the computer assembly.

11. The machine control of claim 10 wherein memory is a disk memory and the RESET input of the memory is effective to prevent initiation of data transfers to storage media of the disk memory.

12. The machine control of claim 9 wherein the switching device is an electromagnetic relay having a coil energized by power applied to the power supply and switching contacts connecting an active level signal to the RESET input of the computer assembly when the coil is de-energized.

13. The machine control of claim 10 wherein the switching device is an electromagnetic relay having a coil energized by power applied to the power supply and switching contacts connecting an active level signal to the RESET input of the computer assembly when the coil is de-energized.

14. The machine control of claim 11 wherein the switching device is an electromagnetic relay having a coil energized by power applied to the power supply and switching contacts connecting an active level signal to the RESET input of the computer assembly when the coil is de-energized.

* * * * *